(12) United States Patent
Duret

(10) Patent No.: US 10,605,937 B2
(45) Date of Patent: Mar. 31, 2020

(54) DEVICE AND METHOD FOR SMART PICKING SURFACE WAVES DISPERSION CURVES

(71) Applicant: CGG SERVICES SAS, Massy (FR)

(72) Inventor: Florian Duret, Montigny-le-Bretonneux (FR)

(73) Assignee: CGG SERVICES SAS, Massy (FR)

( * ) Notice: Subject to any disclaimer, the term of this patent is extended or adjusted under 35 U.S.C. 154(b) by 146 days.

(21) Appl. No.: 15/581,202

(22) Filed: Apr. 28, 2017

(65) Prior Publication Data

US 2017/0343690 A1 Nov. 30, 2017

Related U.S. Application Data

(60) Provisional application No. 62/341,853, filed on May 26, 2016.

(51) Int. Cl.
| | |
|---|---|
| *G01V 1/30* | (2006.01) |
| *G06N 20/00* | (2019.01) |
| *G01V 1/28* | (2006.01) |
| *G01V 1/36* | (2006.01) |
| *G06N 5/04* | (2006.01) |

(52) U.S. Cl.
CPC ............... *G01V 1/303* (2013.01); *G01V 1/28* (2013.01); *G01V 1/36* (2013.01); *G06N 5/045* (2013.01); *G06N 20/00* (2019.01); *G01V 2210/582* (2013.01); *G01V 2210/6222* (2013.01)

(58) Field of Classification Search
CPC .................................................... G01V 1/303
See application file for complete search history.

(56) References Cited

U.S. PATENT DOCUMENTS

| 6,549,854 B1 * | 4/2003 | Malinverno | G01V 1/282 |
| | | | 702/16 |
| 8,509,027 B2 * | 8/2013 | Strobbia | G01V 1/30 |
| | | | 367/38 |
| 2006/0203613 A1 * | 9/2006 | Thomsen | G01V 3/083 |
| | | | 367/38 |
| 2007/0282535 A1 * | 12/2007 | Sirgue | G01V 1/28 |
| | | | 702/14 |
| 2007/0299614 A1 * | 12/2007 | Dewarrat | G01V 1/28 |
| | | | 702/16 |

(Continued)

OTHER PUBLICATIONS

Extended European Search Report in corresponding European Application No. EP 17 30 5513 dated Nov. 10, 2017.

(Continued)

*Primary Examiner* — Manuel L Barbee
*Assistant Examiner* — Raymond L Nimox
(74) *Attorney, Agent, or Firm* — Patent Portfolio Builders PLLC

(57) ABSTRACT

Device and method for calculating a set of surface wave dispersion curves. The method includes receiving seismic data recorded with seismic sensors over an area to be surveyed; selecting region units that cover the area to be surveyed; gathering traces for the region units; processing in a computing device the traces to obtain a set of candidate measurements for each region unit; teaching a decision algorithm based on a first subset of the set of candidate measurements; and calculating the set of surface wave dispersion curves by running the decision algorithm on a second subset of the set of candidate measurements.

18 Claims, 6 Drawing Sheets

(56) References Cited

U.S. PATENT DOCUMENTS

| | | | |
|---|---|---|---|
| 2008/0027650 A1 | 1/2008 | Huang et al. | |
| 2010/0128563 A1* | 5/2010 | Strobbia | G01V 1/30 367/49 |
| 2010/0286919 A1 | 11/2010 | Lee et al. | |
| 2010/0286921 A1* | 11/2010 | Lee | G01V 1/28 702/17 |
| 2011/0134722 A1* | 6/2011 | Virgilio | G01V 1/30 367/75 |
| 2014/0236487 A1* | 8/2014 | Kimman | G01V 1/288 702/18 |
| 2015/0137987 A1 | 5/2015 | Donderici et al. | |

OTHER PUBLICATIONS

J. Stevens, et al.; "Optimization of Surface Wave Identification and Measurement"; Pure and Applied Geophysics; XP007908933; vol. 158; Jan. 2001; pp. 1547-1582.

Z. Jin, et al.; "The inversion of surfa ce-wave frequency dispersion curve based on neural network"; International Conference on Intelligent Human-Machine Systems and Cybernetics, XP031568669; IEEE, Aug. 26, 2009; pp. 339-342.

A.L. Levshin et al., Seismic Surface Waves in Laterally Inhomogeneous Earth, Feb. 1989, Edited by V.I. Keilis Borok, Published by Kluwer Academic Publishers, Russian Edition (Nauka).

Claudio Strobbia et al., "Multi-offset phase analysis of surface wave data (MOPA)", Journal of Applied Geophysics, Aug. 2006, pp. 300-313, vol. 59, Issue 4, Abstract only.

\* cited by examiner

DEVICE AND METHOD FOR SMART PICKING SURFACE WAVES DISPERSION CURVES

CROSS-REFERENCE TO RELATED APPLICATIONS

The present application is related to and claims the benefit of priority of U.S. Provisional Application No. 62/341,853 filed May 26, 2016, the entire contents of which is incorporated herein by reference

TECHNICAL FIELD

Embodiments of the subject matter disclosed herein generally relate to methods and systems for seismic data processing and, more particularly, to mechanisms and techniques for picking surface waves dispersion curves.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves, the collection of reflected/refracted versions of those acoustic waves, and processing the collected seismic data to generate the image. This image does not necessarily provide an accurate location for oil and gas reservoirs, but it may suggest, to those trained in the field, the presence or absence of oil and/or gas reservoirs. Thus, providing an improved image of the subsurface for avoiding drilling a dry well is an ongoing process in the field of seismic surveying.

Seismic data acquisition is typically conducted in a land or marine environment. A configuration for achieving land seismic data is illustrated in FIG. 1. FIG. 1 shows a system 100 that includes plural receivers 102 positioned over an area 104 of a subsurface to be explored and in contact with, or below the surface 106 of, the ground. A number of dedicated seismic sources 108 are also placed on the surface 106 in an area 110, in a vicinity of the area 104 of the receivers 102. Note that a dedicated seismic source is defined as a device built by man with the main purpose of generating seismic waves to be used for a seismic survey. Alternatively, dedicated seismic sources 108 may be buried under surface 106. A central recording device 112 is connected to the plurality of receivers 102 and placed, for example, in a station/truck 114. Each dedicated seismic source 108 can be composed of a variable number of vibrators, typically between one and five, and can include a local controller 116. A central controller 118 can be provided to coordinate the shooting times of sources 108. A global positioning system (GPS) 120 can be used to time-correlate shooting of the dedicated seismic sources 108 and the recordings of the receivers 102.

A configuration for achieving marine seismic data is illustrated in FIG. 2. A marine seismic data acquisition system 200 includes a survey vessel 202 towing a plurality of streamers 204 (one shown) that may extend over kilometers behind the vessel. One or more source arrays 206 may also be towed by the survey vessel 202 or another survey vessel (not shown) for generating seismic waves 208. Conventionally, the source arrays 206 are placed in front of the streamers 204, considering a traveling direction of the survey vessel 202. The seismic waves 208 generated by source arrays 206 propagate downward and penetrate seafloor 210, eventually being reflected by a reflecting structure 212, 214, 216, or 218 at an interface between different layers of the subsurface, back to the surface 219. The reflected seismic waves 220 propagate upward and are detected by detectors 222 provided on the streamers 204. This process is generally referred to as "shooting" a particular seafloor 210 area. A similar setup may be used for an ocean bottom node acquisition system, in which the seismic detectors are directly placed on the ocean bottom 210 and vessel 202 only tows seismic source 206 for generating the seismic waves 220.

A typical problem encountered with all of these seismic acquisition systems is the presence of surface waves. FIG. 3 schematically illustrates a seismic acquisition system 300 having a source 306 and a seismic detector 322 located on ground surface 310 (it can be earth's surface or ocean bottom). Source 306 emits seismic waves. Part of the energy propagates as body waves 319, downward, toward various interfaces 314 and layers of the earth while part of the energy propagates as surface waves 312, at the air-ground interface (for land surveys) or water-ocean bottom interface (for marine surveys).

The surface waves carry a lot of the energy generated by the source and they propagate without radiating into the Earth, i.e., parallel to the Earth's surface. These energies are typically considered to make up the coherent noise in seismic data. The surface noise may include one or more of Rayleigh waves, Lamb waves, Love waves or Scholte waves.

Because the surface waves propagate in the shallow portion of the Earth, they depend on the elastic properties of the superficial Earth, which is known as the near-surface region. Thus, if these waves can be separated from the seismic data and analyzed, they can contribute to the knowledge of the elastic properties in the near-surface. Alternatively, if the objective is to remove them from the acquired seismic data, in order to design accurate filters for achieving this goal, the properties of the surface waves need to be known.

The surface waves are dispersive, i.e., their propagation velocities vary with their frequency. In other words, at low frequencies, the surface waves have a long wavelength and can sample deep layers of the subsurface while at high frequencies, the surface waves have a shorter wavelength and therefore they can sample shallower layers of the subsurface. The term "dispersion curve" describes the behavior of the surface wave as a function of its frequency (or its period, or pulsation). It can be any combination of group velocity/phase velocity/arrival time vs frequency/period/pulsation.

However, the recorded seismic data that includes the surface waves includes many propagation velocities that correspond to a same frequency of a given surface wave, i.e., the data is ambiguous and it needs to be disambiguated.

As the present geophysical acquisitions patterns become ever denser, both in number of sources and receivers, thus giving high redundancy subsurface characterization, there is a need to obtain the propagation velocities of the surface waves as a function of their frequency (the dispersion curve) that take advantage of this high redundancy.

SUMMARY

According to an embodiment, there is a method for calculating a set of surface wave dispersion curves. The method includes receiving seismic data recorded with seismic sensors over an area to be surveyed; selecting region units that cover the area to be surveyed; gathering traces for the region units; processing in a computing device the traces to obtain a set of candidate measurements for each region unit; teaching a decision algorithm based on a first subset of the set of candidate measurements; and calculating the set of surface wave dispersion curves by running the decision algorithm on a second subset of the set of candidate measurements.

According to another embodiment, there is a device for calculating a set of surface wave dispersion curves. The device includes an interface for receiving seismic data recorded with seismic sensors over an area to be surveyed; and a processor connected to the interface. The processor is configured to select region units that cover the area to be surveyed, gather traces for the region units, process the traces to obtain a set of candidate measurements for each region unit, teach a decision algorithm based on a first subset of the set of candidate measurements, and calculate the set of surface wave dispersion curves by running the decision algorithm on a second subset of the set of candidate measurements.

According to still another embodiment, there is a non-transitory computer readable medium including computer executable instructions, wherein the instructions, when executed by a computer, implement a method for calculating a set of surface wave dispersion curves as discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. For simplicity, the following embodiments refer to the surface waves. However, the methods discussed herein equally apply to body waves and for this case, only one velocity or one propagation time is output.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method for disambiguating seismic data that includes surface waves so that it is possible to select the propagation velocity of a surface wave as a function of its frequency. The method uses a decision algorithm for this task that is trained on a set of candidates as now discussed.

Figure 4:
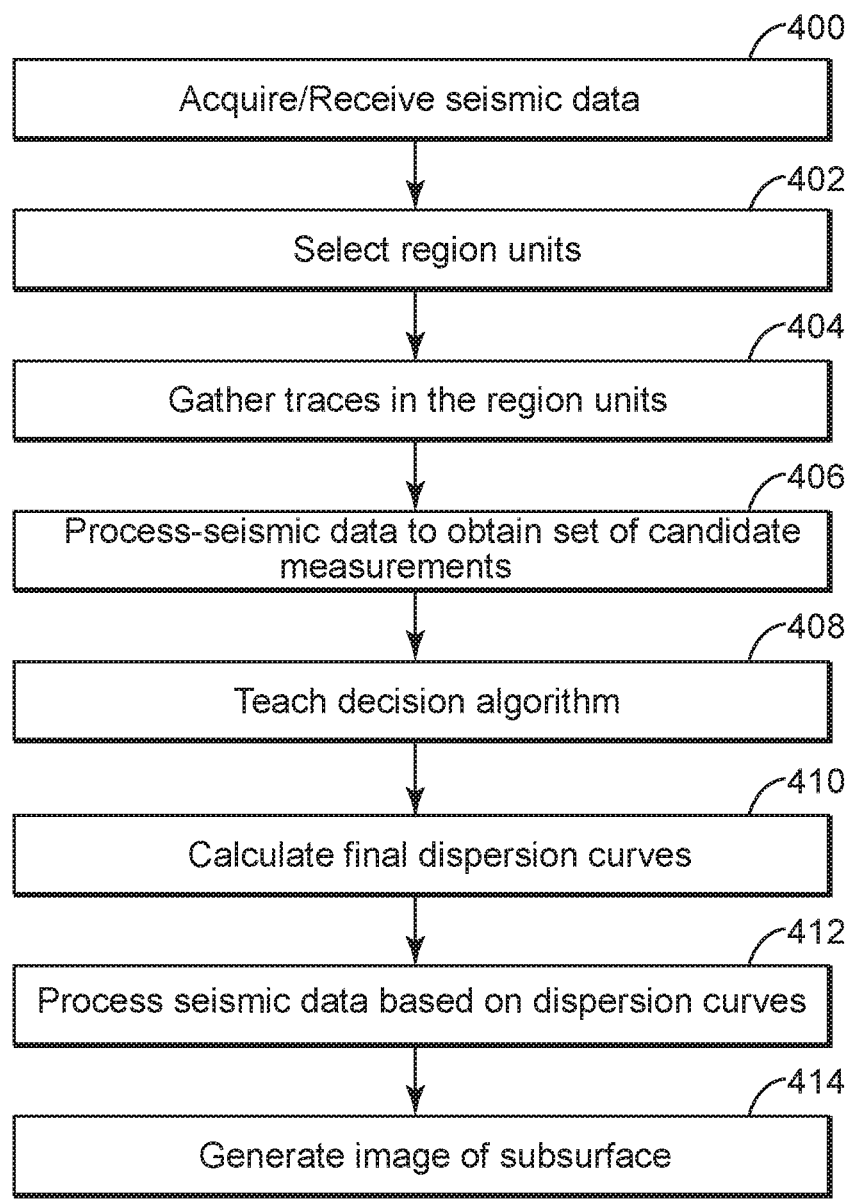
FIG. 4 is a flowchart of a method for calculating final dispersion curves for the surface waves.

The method includes, as illustrated in FIG. 4, a step 400 of acquiring seismic data over a survey area in a marine or land environment, a step 402 of selecting region units for the survey area, a step 404 of gathering traces in one or more of the region units, a step 406 of processing the traces, for each selected region unit, to obtain a set of candidate measurements, a step 408 of teaching a decision algorithm based on selected measurements from the set of candidate measurements, a step 410 of running the decision algorithm, for each region unit, to obtain a set of final dispersion curves for the surface waves, a step 412 of applying the set of final dispersion curves for processing the acquired seismic data, and, optionally, a step 414 of generating an image of the surveyed subsurface.

Figure 1:
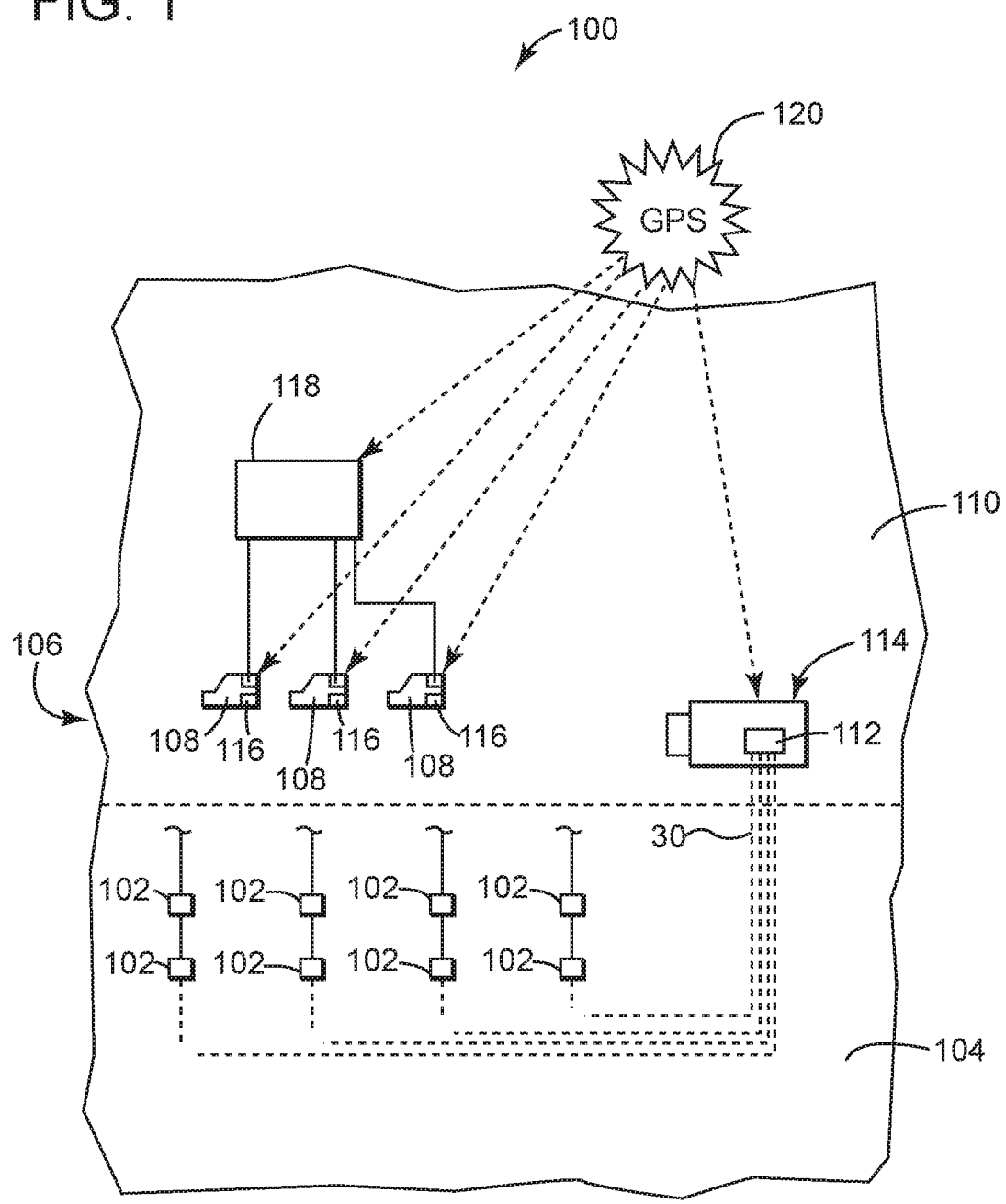
FIG. 1 illustrates a conventional land seismic data acquisition system.
Figure 2:
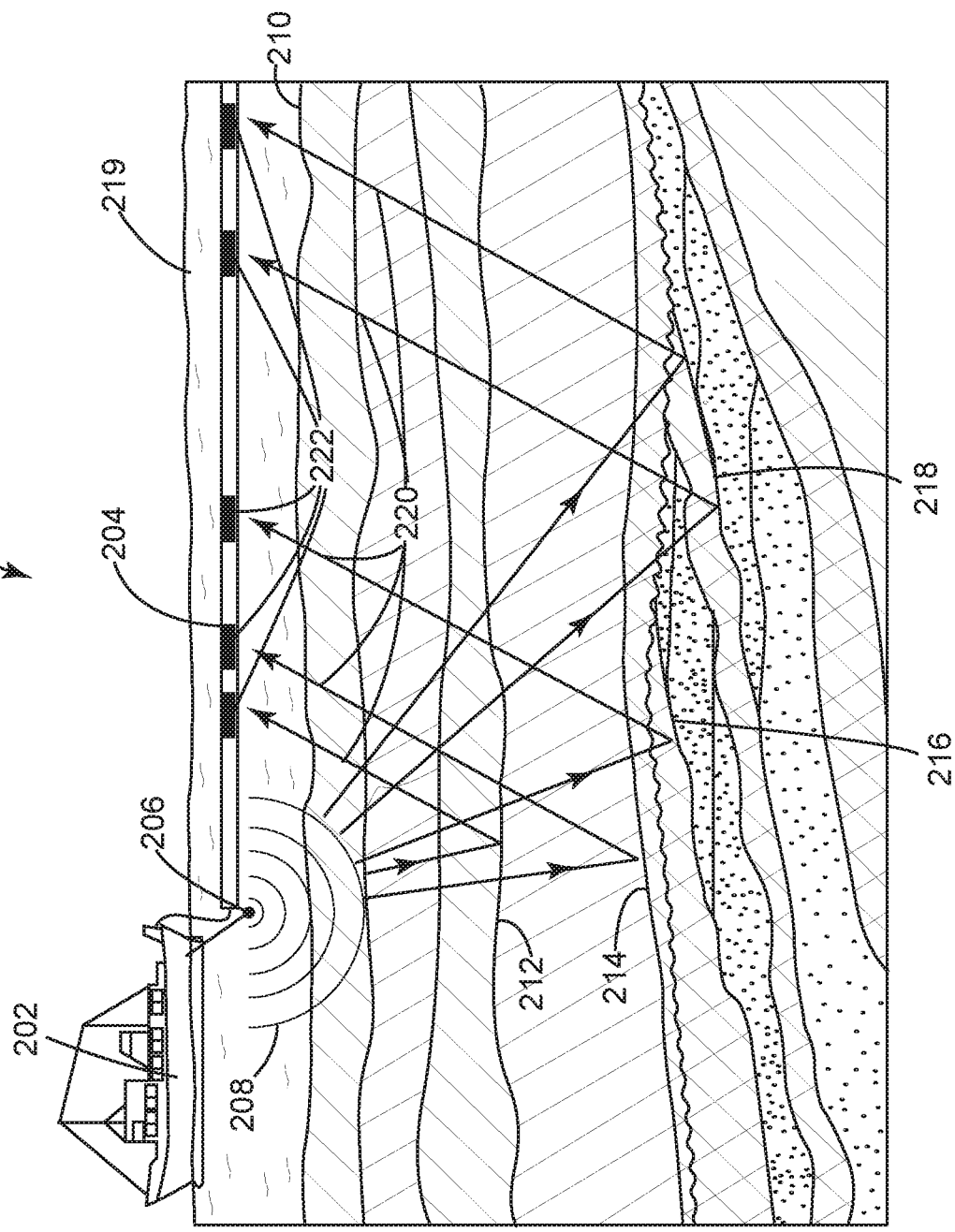
FIG. 2 illustrates a conventional marine data acquisition system.
Figure 3:
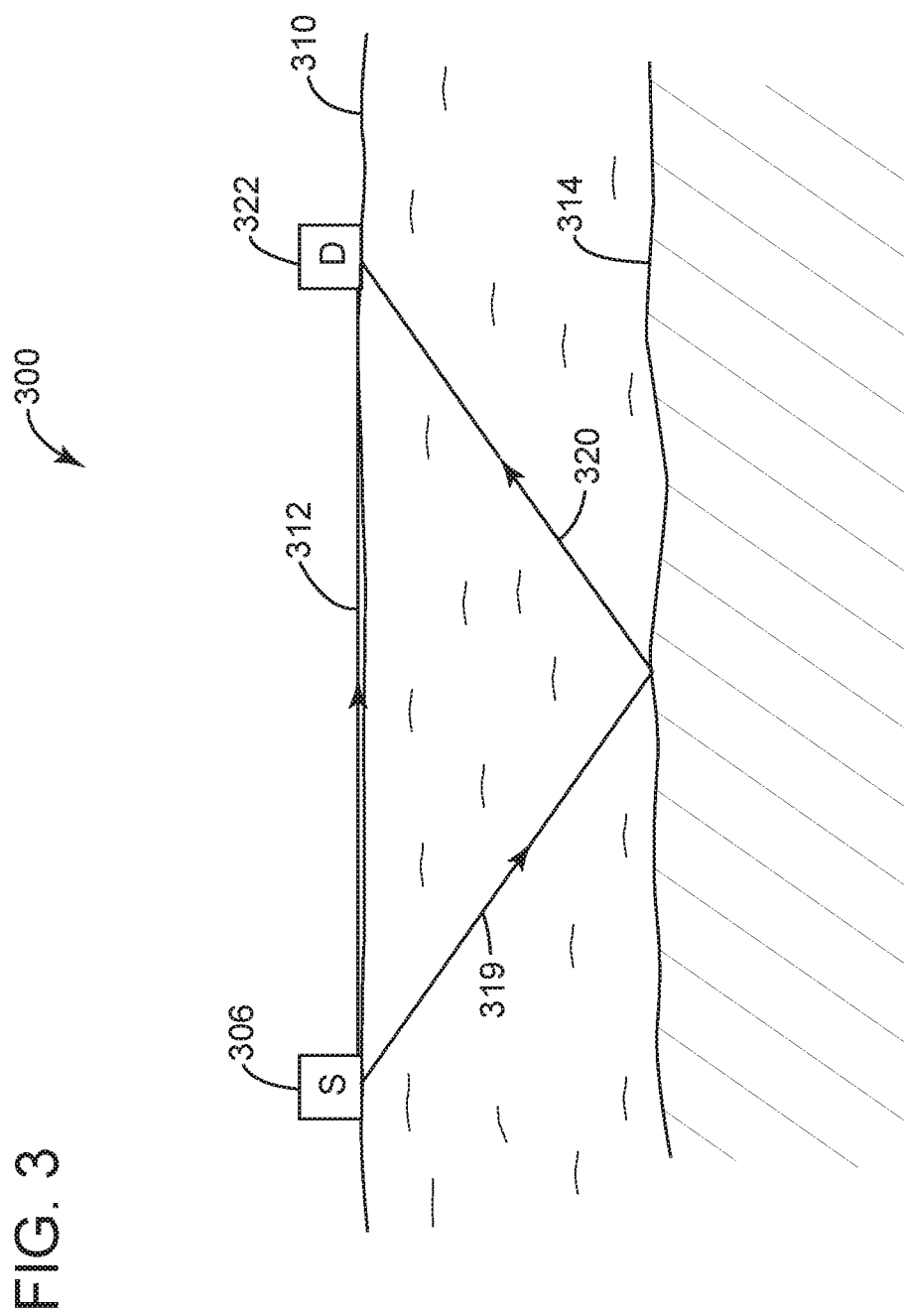
FIG. 3 illustrates body and surface waves that are generated during a seismic survey.

The steps of this method are now discussed in more detail. Step 400 of acquiring the seismic data may happen on land with the configuration shown in FIG. 1, or on water, with the configuration shown in FIG. 2. Other configurations may be used, e.g., passive seismic acquisition, or seismic wave-field reconstructed by cross-correlation, or micro-seismicity. The seismic source may be any known source, e.g., a vibratory source or an air gun. The seismic detectors may include hydrophones, geophones, accelerometers, optical fibers, etc. The acquired data may be one component or multi-component. In one application, the operator of a computing system that runs the method receives the seismic data for processing instead of acquiring it.

In step 402, region units connected to the seismic survey are selected. The selected region units may cover the entire or, parts of the surveyed area. A "region unit" is defined as an ensemble of source-receiver pairs, lying in the same area, and presenting similar geometries. For example, in one application, the source-receiver pairs have similar offset distances and azimuths. Note that the term "source" includes a dedicated seismic source, e.g., vibrator, gun, another receiver and/or an earthquake. In the same application or another one, the ends of the source-receiver pairs need to be close to each other.

Thus, a region unit can be a spatial area on which a set of sources and receivers are located and the set of sources and receivers have similar geographical coordinates and/or similar azimuth and/or similar offset distances. It can also be defined as a set of areas with similar geography/geology. The size of a region unit depends on the wavelength of the surface waves. For example, the size of a region unit (its length) may be between one and ten wavelengths of the investigated surface waves.

In step 404, traces belonging to a common region unit are gathered to be processed together. As discussed above, one or more region units may be used. The number of region units depends on the goal of the survey. For example, if the goal is to map all the surface waves to the area of the survey, then the number of selected region units should completely cover the survey area. For other goals, a number of region units that do not fully cover the survey area may be used. Thus, this step is applied to some or all the region units that cover the survey area.

In step 406, the traces from the selected region units are processed. In each region unit, the traces may be processed with techniques that highlight arrival times as a function of frequency. For example, it is possible to use Time-Frequency Analysis (Levshin et al., 1989, "Seismic Surface Waves in Laterally Inhomogeneous Earth," Kluwer Publ. House, Dordrecht/Boston/London, Russian Edition (Nauka), 1988), but it is also possible to use the technique MOPA (C. Strobbia and S Foti, "Multi-offset phase analysis of surface wave data (MOPA)," Journal of Applied Geophysics, Volume 59, Issue 4, Pages 300-313). Those skilled in the art would know to use other techniques if so desired.

Some of the above noted techniques usually project the traces in a domain in which the arrival times may be determined. Each trace in such domain is analysed with a computer for determining a number of local maxima. These local maxima are selected at each frequency to obtain the set of candidate measurements of arrival times as a function of frequency. Then, the arrival times may be converted to velocities. This means that for one trace and one frequency, there may be multiple velocities, i.e., the result is ambiguous.

These measurements (e.g., traces) are then sorted out between "confirmed" and "ambiguous" as follows. If for a given trace and a given frequency, only one maximum has been measured within the surface wave velocity range, that measurement is labelled as "confirmed." If for a given trace and a given frequency, several maxima have been measured within the surface wave velocity range, the measurement is labelled as "ambiguous." Both the confirmed and ambiguous measurements are part of the set of candidate measurements.

In step 408, the decision algorithm is trained only with the measurements labelled "confirmed" to calculate dispersion curves. The decision algorithm is an algorithm that will predict surface wave velocities at a given frequency using a certain model. This model is built locally (e.g., on a few Hertz range of data) by modeling a straight line using a linear regression.

The decision algorithm can be a "supervised learning algorithm" as described above, or an "unsupervised learning algorithm" where the learning algorithm would be fed with unlabeled candidate measurements, and would set its own decision making rules. The decision making rules can be set on the seismic survey being processed, or can be extracted from a database build using the lessons learned on previous surveys. The entire process can be run in real-time while seismic data is still being recorded, or as part of a processing sequence once all data has been acquired.

The model noted above may be built as follows: assume that a dispersion curve can locally (over a few Hertz range of frequency) be approximated to a straight line, and that all dispersion curves within the region unit are similar. This assumption is true as any curve can be approximated with a straight line for a short portion. Use then the measurements labelled as "confirmed" to run a linear regression algorithm to model a set of straight lines over the entire frequency range. The decision algorithm may be taught over the entire frequency range. The decision algorithm may be run on each selected region unit.

In step 410, the decision algorithm is run on the ambiguous measurements for calculating their final dispersion curves. The decision algorithm provides the predicted velocity for frequencies corresponding to measurements that were labeled ambiguous as now discussed. As noted above, because the measurements are ambiguous, there are plural measured velocities (the arrival times transformed in step 406 into velocities) for a given frequency. The decision algorithm predicts a single velocity for each given frequency. Thus, the measurement that is closest to the predicted velocity is kept as the disambiguated measurement.

In other words, assume that for a given frequency f, there are three measured velocities v1, v2, and v3. The decision algorithm predicts a velocity vp. The measured velocity closest to vp, (assume to be v2) is then selected as the measurement to be kept. The other two velocities v1 and v3 are discarded.

In this step, both the disambiguated measurements and those labelled "confirmed" are collected to form the final set of surface wave dispersion curves.

The final set of surface wave dispersion curves is used in step 412 to process the initial seismic data. For example, in one embodiment, the information from step 410 is used to map the surface waves to the surveyed surface, or to build a velocity model, or for statics corrections. In one embodiment, the final set of surface wave dispersion curves is used to design filters for removing the surface waves from the recorded seismic data. For this instance, the "cleaned data" (i.e., recorded seismic data from which the surface waves have been removed) is used in step 414 for generating an image of the surveyed subsurface.

Figure 5:
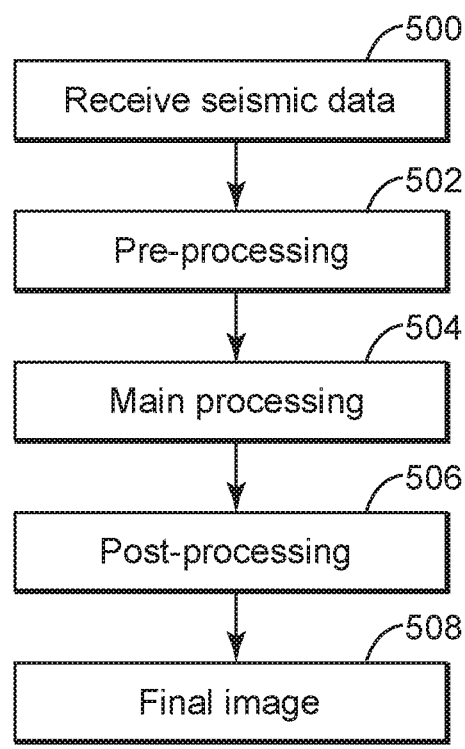
FIG. 5 is a flowchart of a method for processing seismic data.

The seismic data processed in step 412 may be run through other processing algorithms prior to generating a final image of the surveyed subsurface. For example, seismic data generated with the source elements as discussed with regard to FIGS. 1 and 2 may be received in step 500 of FIG. 5 at a processing device. In step 502, pre-processing methods are applied, e.g., demultiple, signature deconvolution, trace summing, vibroseis correlation, resampling, etc. In step 504, the main processing takes place, e.g., deconvolution, amplitude analysis, statics determination, common middle point gathering, velocity analysis, normal move-out correction, muting, trace equalization, stacking, noise rejection, amplitude equalization, etc. In step 506, final or post-processing methods are applied, e.g. migration, wavelet processing, inversion, etc. In step 508, the final image of the subsurface is generated.

Figure 6:
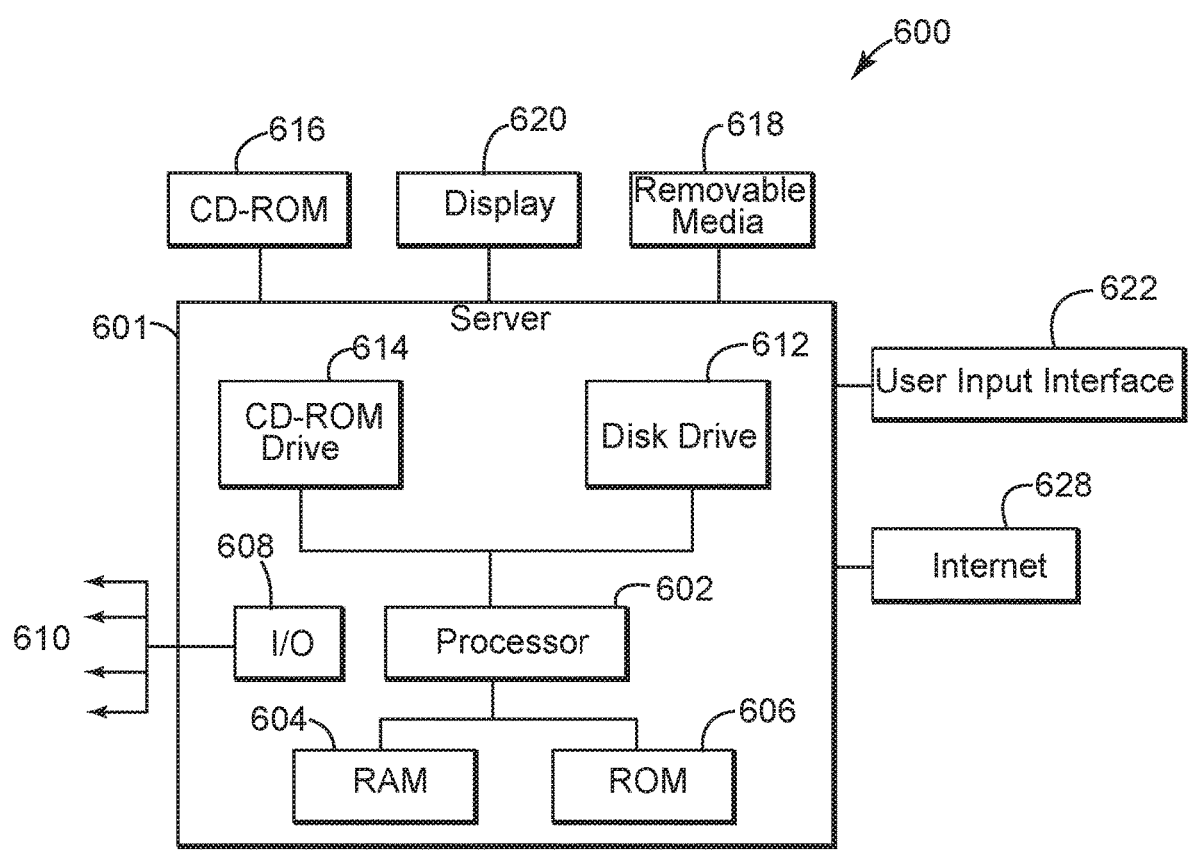
FIG. 6 illustrates an exemplary data processing device or system which can be used to implement the methods discussed herein.

The above-discussed procedures and methods may be implemented in a computing device as illustrated in FIG. 6. Hardware, firmware, software or a combination thereof may be used to perform the various steps and operations described herein. Computing device 600 of FIG. 6 is an exemplary computing structure that may be used in connection with such a system.

Exemplary computing device 600 suitable for performing the activities described in the exemplary embodiments may include a server 601. Such a server 601 may include a central processor (CPU) 602 coupled to a random access memory (RAM) 604 and to a read-only memory (ROM) 606. ROM 606 may also be other types of storage media to store programs, such as programmable ROM (PROM), erasable PROM (EPROM), etc. Processor 602 may communicate with other internal and external components through input/output (I/O) circuitry 608 and bussing 610 to provide control signals and the like. Processor 602 carries out a variety of functions as are known in the art, as dictated by software and/or firmware instructions.

Server 601 may also include one or more data storage devices, including hard drives 612, CD-ROM drives 614 and other hardware capable of reading and/or storing information, such as DVD, etc. In one embodiment, software for carrying out the above-discussed steps may be stored and distributed on a CD-ROM or DVD 616, a USB storage device 618 or other form of media capable of portably storing information. These storage media may be inserted into, and read by, devices such as CD-ROM drive 614, disk drive 612, etc. Server 601 may be coupled to a display 620, which may be any type of known display or presentation screen, such as LCD, plasma display, cathode ray tube (CRT), etc. A user input interface 622 is provided, including one or more user interface mechanisms such as a mouse, keyboard, microphone, touchpad, touch screen, voice-recognition system, etc.

Server 601 may be coupled to other devices, such as sources, detectors, etc. The server may be part of a larger network configuration as in a global area network (GAN) such as the Internet 628, which allows ultimate connection to various landline and/or mobile computing devices.

The disclosed exemplary embodiments provide a computing device, software and method for calculating a final set of surface wave dispersion curves. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geo-physics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration that calculates surface wave dispersion curves, the method comprising:
    acquiring seismic data recorded with seismic sensors over an area;
    selecting region units within the area;
    gathering traces for each of the region units;
    processing in a computing device the traces to obtain a set of candidate measurements for each region unit;
    teaching a decision algorithm based on a first subset of the set of candidate measurements to predict surface wave velocities at given frequencies, the first subset including confirmed velocity measurements obtained for a sole local maximum on a trace component at one of the given frequencies;
    calculating the surface wave dispersion curves by running the decision algorithm on a second subset of the set of candidate measurements; and
    generating an image of a subsurface below the area by processing the seismic data using the surface wave dispersion curves, the image being useable to plan oil and gas extraction from the subsurface.

2. The method of claim 1, further comprising:
    determining one or more of local maxima for each trace and for each of the given frequencies to obtain the set of candidate measurements.

3. The method of claim 2, further comprising:
    converting arrival times associated with each of the local maxima into surface velocity values.

4. The method of claim 3, further comprising:
    for traces with two or more local maxima, determine which one of the surface velocity values is closest to a value predicted based on the surface wave dispersion curves,
    wherein the surface velocity values corresponding to the two or more local maxima are ambiguous measurements, and the one of the surface velocity values is a disambiguated measurement.

5. The method of claim 1, wherein the teaching the decision algorithm comprises:
    approximating a dispersion curve with a straight line for a range of a few Hertz;
    using only the confirmed velocity measurements to run a linear regression algorithm to model a set of straight lines over an entire frequency range; and
    teaching the decision algorithm over the entire frequency range.

6. The method of claim 5, further comprising:
    generating the set of surface wave dispersion curves to include the confirmed measurement and the disambiguated measurement.

7. The method of claim 1, further comprising:
    removing from the seismic data the surface waves based on the set of surface wave dispersion curves.

8. The method of claim 7, wherein the image of the surveyed area is generated based on the seismic data from which the surface waves have been removed.

9. The method of claim 1, further comprising:
    calculating a velocity model based on the surface wave dispersion curves.

10. A device for seismic exploration that calculates surface wave dispersion curves, the device comprising:
    an interface for receiving seismic data acquired with seismic sensors over an area; and
    a processor connected to the interface and configured to,
        select region units within the area to be surveyed,
        gather traces for each of the region units,
        process the traces to obtain a set of candidate measurements for each region unit,
        teach a decision algorithm based on a first subset of the set of candidate measurements to predict surface wave velocities at given frequencies, the first subset including confirmed velocity measurements obtained for a sole local maximum on a trace component at one of the given frequencies,
        calculate the surface wave dispersion curves by running the decision algorithm on a second subset of the set of candidate measurements, and
        process the seismic data using the surface wave dispersion curves to generate an image of a subsurface below the area, the image being useable to locate a reservoir in the subsurface.

11. The device of claim 10, wherein the processor is further configured to:
    determine one or more of local maxima for each trace and for each of the given frequencies to obtain the set of candidate measurements.

12. The device of claim 11, wherein the processor is further configured to:
    convert arrival times associated with each of the local maxima into surface velocity values.

13. The device of claim 12, wherein the processor is further configured to:
    determine, for traces with two or more local maxima, one of the surface velocity values that is closest to a value predicted based on the surface wave dispersion curves, wherein the surface velocity values corresponding to the two or more maxima are ambiguous measurements, and the one of the surface velocity values is a disambiguated measurement.

14. The device of claim 10, wherein the processor is further configured to:
    approximate a dispersion curve with a straight line for a range of a few Hertz,
    use only the confirmed measurements to run a linear regression algorithm to model a set of straight lines over an entire frequency range, and
    teach the decision algorithm over the entire frequency range.

15. The device of claim 14, wherein the processor is further configured to:
    generate the set of surface wave dispersion curves to include the confirmed measurement and the disambiguated measurement.

16. The device of claim 10, wherein the processor is further configured to:
    remove from the seismic data the surface waves based on the sct of surface wave dispersion curves.

17. The device of claim 16, wherein the processor is further configured to:
    generate the image of the surveyed area based on the seismic data from which the surface waves have been removed.

18. A non-transitory computer readable medium including computer executable instructions, wherein the instructions, when executed by a computer, implement a method for seismic exploration that calculates surface wave dispersion curves, the method comprising:
    acquiring seismic data recorded with seismic sensors over an area;
    selecting region units within the area;
    gathering traces for each of the region units;
    processing in a computing device the traces to obtain a set of candidate measurements for each region unit;
    teaching a decision algorithm based on a first subset of the set of candidate measurements to predict surface wave velocities at given frequencies, the first subset including confirmed velocity measurements obtained for a sole local maximum on a trace component at one of the given frequencies;
    calculating the surface wave dispersion curves by running the decision algorithm on a second subset of the set of candidate measurements; and
    generating an image of a subsurface below the area by processing the seismic data using the surface wave dispersion curves, the image being useable to plan oil and gas extraction from the subsurface.

* * * * *